United States Patent
Nagase et al.

(10) Patent No.: US 9,281,133 B2
(45) Date of Patent: Mar. 8, 2016

(54) ELECTRODE FOR ELECTROCHEMICAL DEVICE, ELECTROCHEMICAL DEVICE, AND METHOD FOR MANUFACTURING ELECTRODE FOR ELECTROCHEMICAL DEVICE

(71) Applicant: TAIYO YUDEN CO., LTD., Taito-ku, Tokyo (JP)

(72) Inventors: Takatoshi Nagase, Takasaki (JP); Naoto Hagiwara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 208 days.

(21) Appl. No.: 14/227,749

(22) Filed: Mar. 27, 2014

(65) Prior Publication Data

US 2014/0347789 A1 Nov. 27, 2014

(30) Foreign Application Priority Data

May 24, 2013 (JP) .................. 2013-110221

(51) Int. Cl.
*H01G 11/70* (2013.01)
*H01G 11/28* (2013.01)
*H01G 11/86* (2013.01)

(52) U.S. Cl.
CPC ............... *H01G 11/28* (2013.01); *H01G 11/70* (2013.01); *H01G 11/86* (2013.01); *Y10T 29/49204* (2015.01)

(58) Field of Classification Search
CPC ....... H01G 9/155; H01G 9/048; H01G 11/66; H01G 11/70
See application file for complete search history.

(56) References Cited

U.S. PATENT DOCUMENTS

| 2003/0147201 | A1 | 8/2003 | Nakazawa et al. |
| 2010/0221587 | A1* | 9/2010 | Yanagita ................ H01G 9/016 429/94 |
| 2011/0039146 | A1* | 2/2011 | Sato .................. H01M 10/0418 429/152 |
| 2012/0288747 | A1* | 11/2012 | Naoi ....................... H01G 11/12 429/178 |
| 2012/0288758 | A1* | 11/2012 | Hosoe .................... H01G 11/06 429/211 |
| 2013/0000110 | A1 | 1/2013 | Takeda et al. |

FOREIGN PATENT DOCUMENTS

| JP | 2000-036306 A | 2/2000 |
| JP | 2003-188050 A | 7/2003 |

(Continued)

OTHER PUBLICATIONS

A Notice of Reasons for Refusal issued by Japanese Patent Office, mailed Aug. 20, 2013, for Japanese counterpart application No. 2013-110221.

(Continued)

*Primary Examiner* — Dion R Ferguson
(74) *Attorney, Agent, or Firm* — Law Office of Katsuhiro Arai

(57) ABSTRACT

An electrode for an electrochemical device includes a current collector and an electrode layer. The current collector has a main face and a side face. The side face has a concave-convex shape whose convex part is constituted by a projection extending along the main face. The projection is formed along a periphery of the electrode layer, forming a support portion. The electrode layer contains active material and is formed on and in contact with the main face including a surface formed by the support portion. The electrode is capable of mitigating the concentration of current at the edges of the electrode layer.

3 Claims, 5 Drawing Sheets

(56) References Cited

FOREIGN PATENT DOCUMENTS

| | | |
|---|---|---|
| JP | 2008-262791 A | 10/2008 |
| WO | 2012/077707 A1 | 6/2012 |

OTHER PUBLICATIONS

A Notice of Reasons for Refusal issued by Japanese Patent Office, mailed Jan. 7, 2014, for Japanese counterpart application No. 2013-110221.

* cited by examiner (a)

(b)

ELECTRODE FOR ELECTROCHEMICAL DEVICE, ELECTROCHEMICAL DEVICE, AND METHOD FOR MANUFACTURING ELECTRODE FOR ELECTROCHEMICAL DEVICE

FIELD OF THE INVENTION

The present invention relates to an electrode for an electrochemical device containing active material, an electrochemical device, and a method for manufacturing an electrode for an electrochemical device.

DESCRIPTION OF THE RELATED ART

An electric double-layer capacitor comprises a positive electrode and negative electrode facing each other via a separator and sealed together with electrolyte. When voltage is applied between the positive electrode and negative electrode, electric double layers are formed at the positive electrode and negative electrode and electric charges are accumulated. The electrodes (positive electrode and negative electrode) are generally made of electrode layers containing active carbon or other active material that are stacked on top of a metal foil or other current collector, where active carbon with large surface area is often used for the active material.

Various structures for electric double-layer capacitors have been developed. For example, the capacitor described in Patent Literature 1 uses an embossed or corrugated current collector to improve the adhesion property between the current collector and electrode. On the other hand, the electric double-layer capacitor described in Patent Literature 2 uses a current collector formed in a concave-convex shape by tightly press-fitting it onto the concave-convex-shaped surface of the electrode in order to improve the adhesion property between the current collector and electrode.

BACKGROUND ART LITERATURES

[Patent Literature 1] Japanese Patent Laid-open No. 2000-36306
[Patent Literature 2] Japanese Patent Laid-open No. 2003-188050

SUMMARY

It should be mentioned that electric double-layer capacitors present the problem of electrode deterioration caused by concentration of current at the edges of the electrode layer, which leads to a drop in device reliability. The current collector described in Patent Literature 1 is embossed/corrugated in a way producing the anchoring effect, meaning that such machining is not provided on the side faces of the current collector and current concentrates at the edges of the electrodes as a result. In addition, the concave-convex shape described in Patent Literature 2 is absent on the side faces of the current collector that are not contacted by the electrodes, and current concentrates at the edges of the electrodes as a result.

In light of the aforementioned circumstance, an object of the present invention is to provide an electrode for an electrochemical device capable of mitigating the concentration of current at the edges of the electrode layer, an electrochemical device, and a method for manufacturing an electrode for an electrochemical device.

To achieve the aforementioned object, an electrode for an electrochemical device pertaining to an embodiment of the present invention comprises a current collector and an electrode layer.

The current collector has a main face and a side face.

The electrode layer contains active material, is formed on the main face, and has a flange projecting like an eaves from the side face.

To achieve the aforementioned object, an electrode for an electrochemical device pertaining to an embodiment of the present invention comprises a current collector and an electrode layer.

The current collector has a main face, as well as a side face of concave-convex shape whose main-face side is projecting.

The electrode layer contains active material and is formed on the main face.

To achieve the aforementioned object, an electrochemical device pertaining to an embodiment of the present invention comprises a first electrode, a second electrode, and a separator.

The first electrode comprises a first current collector that has a first main face and a first side face, as well as a first electrode layer containing active material, formed on the first main face and having a flange projecting like an eave from the first side face.

The second electrode comprises a second current collector that has a second main face and a second side face, as well as a second electrode layer containing active material, formed on the second main face and having a flange projecting like an eave from the second side face.

The separator is placed between the first electrode and second electrode to prevent the first electrode layer and second electrode layer from contacting each other.

To achieve the aforementioned object, an electrochemical device pertaining to an embodiment of the present invention comprises a first electrode, a second electrode, and a separator.

The first electrode comprises a first current collector that has a first main face and a first side face of concave-convex shape whose first-main-face side is projecting, as well as a first electrode layer that contains active material and is formed on the first main face.

The second electrode comprises a second current collector that has a second main face and a second side face of concave-convex shape whose second-main-face side is projecting, as well as a second electrode layer that contains active material and is formed on the second main face.

The separator is placed between the first electrode and second electrode to prevent the first electrode layer and second electrode layer from contacting each other.

To achieve the aforementioned object, a method for manufacturing an electrode for an electrochemical device pertaining to an embodiment of the present invention comprises forming an electrode layer containing active material on the main face of a current collector having a main face and a side face.

A flange projecting like an eave from the side face is formed on the electrode layer by means of rolling the current collector and electrode layer.

To achieve the aforementioned object, a method for manufacturing an electrode for an electrochemical device pertaining to an embodiment of the present invention comprises forming an electrode layer containing active material on the main face of a current collector having a main face and a side face.

The side face is formed in concave-convex shape with its main-face side projecting, by means of rolling the current collector and electrode layer.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

Figure 1:
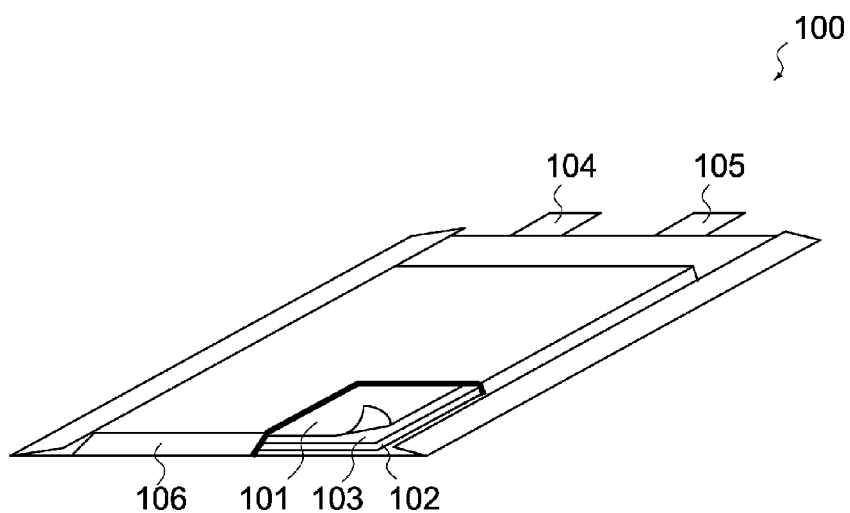
FIG. 1 is a perspective section view of the electrochemical device pertaining to a first embodiment of the present invention.

DESCRIPTION OF THE SYMBOLS 100, 200—Electrochemical device
101, 201—Positive electrode
102, 202—Negative electrode
103—Separator
104—Positive electrode terminal
105—Negative electrode terminal
106—Film package
110, 210—Positive electrode current collector
110a, 210a—Main face
110b, 210b—Side face
111, 211—Positive electrode layer
111a—Flange
113, 213—Negative electrode current collector
113a, 213a—Main face
113b, 213b—Side face
114, 214—Negative electrode layer
114a—Flange

DETAILED DESCRIPTION OF EMBODIMENTS

The electrode for an electrochemical device pertaining to the following embodiment comprises a current collector and an electrode layer.

The current collector has a main face and a side face.

The electrode layer contains active material, is formed on the main face, and has a flange projecting like an eave from the side face.

According to this constitution, the flange formed on the electrode layer disperses the electric charges and increases the charge collecting resistance at the edges of the electrode layer. This in turn mitigates the concentration of current at the edges and therefore electrode deterioration can be prevented and reliability of the electrochemical device can be improved.

The electrode for an electrochemical device pertaining to this embodiment comprises a current collector and an electrode layer.

The current collector has a main face, as well as a side face of concave-convex shape whose main-face side is projecting.

The electrode layer contains active material and is formed on the main face.

According to this constitution, the side face of the current collector may be formed of concave-convex shape whose main-face side is projecting, and this disperses the electric charges and increases the charge collecting resistance at the edges of the electrode layer. This in turn mitigates the concentration of current at the edges and therefore electrode deterioration can be prevented and reliability of the electrochemical device can be improved.

The electrochemical device pertaining to the following embodiment comprises a first electrode, a second electrode, and a separator.

The first electrode comprises a first current collector that has a first main face and a first side face, as well as a first electrode layer containing active material, formed on the first main face and having a flange projecting like an eave from the first side face.

The second electrode comprises a second current collector that has a second main face and a second side face, as well as a second electrode layer containing active material, formed on the second main face and having a flange projecting like an eave from the second side face.

The separator is placed between the first electrode and second electrode to prevent the first electrode layer and second electrode layer from contacting each other.

According to this constitution, concentration of current is mitigated at the edges of the electrode layers at the first electrode and second electrode and reliability of the electrochemical device can be improved as a result.

The electrochemical device pertaining to the following embodiment comprises a first electrode, a second electrode, and a separator.

The first electrode comprises a first current collector that has a first main face and a first side face of concave-convex shape whose first-main-face side is projecting, as well as a first electrode layer that contains active material and is formed on the first main face.

The second electrode comprises a second current collector that has a second main face and a second side face of concave-convex shape whose second-main-face side is projecting, as well as a second electrode layer that contains active material and is formed on the second main face.

The separator is placed between the first electrode and second electrode to prevent the first electrode layer and second electrode layer from contacting each other.

According to this constitution, concentration of current is mitigated at the edges of the electrode layers at the first electrode and second electrode and reliability of the electrochemical device can be improved as a result.

The method for manufacturing an electrochemical device pertaining to this embodiment comprises forming an electrode layer containing active material on the main face of a current collector having a main face and a side face.

A flange projecting like an eave from the side face is formed on the electrode layer by means of rolling the current collector and electrode layer.

According to this constitution, a flange projecting like an eave from the side face of the current collector can be formed on the electrode layer.

The method for manufacturing an electrochemical device pertaining to the following embodiment comprises forming an electrode layer containing active material on the main face of a current collector having a main face and a side face.

The side face is formed in concave-convex shape with its main-face side projecting, by means of rolling the current collector and electrode layer.

According to this constitution, the side face of the current collector can be formed in concave-convex shape with its main-face side projecting.

First Embodiment

Figure 2:
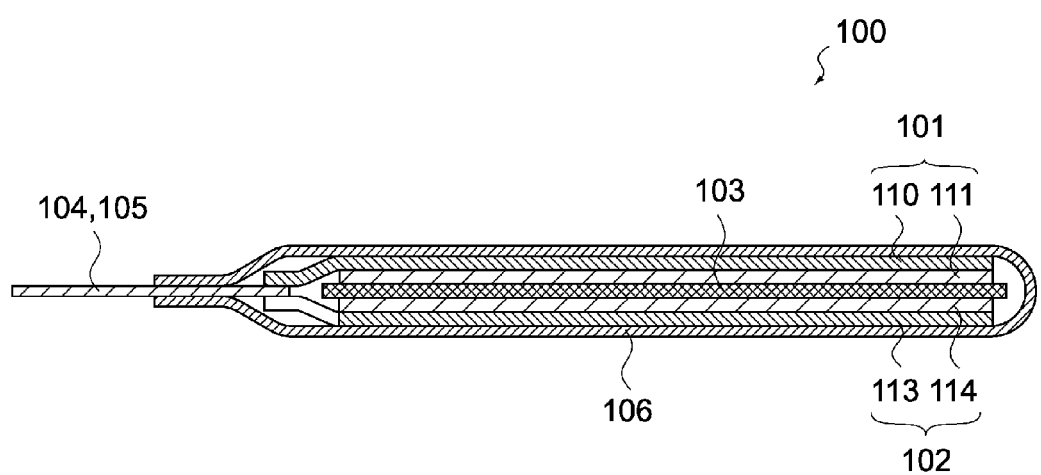
FIG. 2 is a section view of the same electrochemical device.

The electrochemical device pertaining to a first embodiment of the present invention is explained.
[Structure of Electrochemical Device]
FIG. 1 is a perspective section view of an electrochemical device 100 pertaining to this embodiment, while FIG. 2 is a section view of the electrochemical device 100.

As shown in these figures, the electrochemical device 100 has a positive electrode 101, negative electrode 102, separator 103, positive electrode terminal 104, negative electrode terminal 105, and film package 106. The positive electrode 101 and negative electrode 102 are facing each other with the separator 103 in between, and housed in the film package 106. The positive electrode terminal 104 connects to the positive electrode 101, while the negative electrode terminal 105 connects to the negative terminal 102, and both are led from the film package 106. Electrolyte is sealed in the film package 106.

While one positive electrode 101 and one negative electrode 102 are provided in FIGS. 1 and 2, each electrode can also be provided in a multiple number. In this case, the multiple positive electrodes 101 and multiple negative electrodes 102 can be layered via the separators 103. Additionally, the electrochemical device 100 may be a laminate of the positive electrode 101, negative electrode 102, and separator 103 rolled together.

Figure 3:
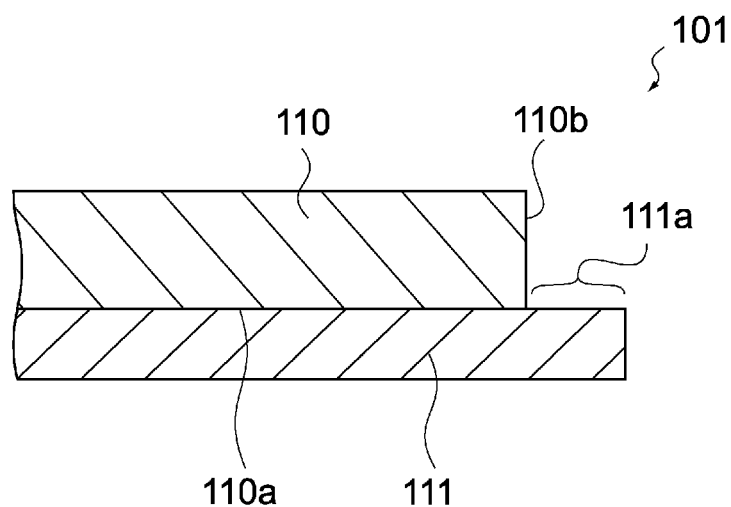
FIG. 3 is a section view of the positive electrode of the same electrochemical device.

The positive electrode 101 functions as the positive electrode of the electrochemical device 100. FIG. 3 is an enlarged section view of the positive electrode 101. As shown in this figure, the positive electrode 101 has a positive electrode current collector 110 and positive electrode layer 111.

The positive electrode current collector 110 may be a foil made of metal or other conductive material, such as an aluminum foil. As shown in FIG. 3, the positive electrode current collector 110 has a main face 110a and a side face 110b. The main face 110a is a surface (front or back face) along the direction vertical to the thickness direction of the positive electrode current collector 110, while the side face 110b is a surface (end face) along the thickness direction of the positive electrode current collector 110.

The positive electrode layer 111 is a layer containing active material and formed on the main face 110a of the positive electrode current collector 110. To be specific, the positive electrode layer 111 may be constituted by active material and binder, and it can be a mixture of active carbon being the active material and synthetic resin being the binder. If the separator 103 is to be layered on both the front face and back face of the positive electrode 101, then the positive electrode layer 111 can be provided not only on the main face 110a, but also on its back face.

The positive electrode layer 111 has a flange 111a. The flange 111a is a part projecting like an eave from the side face 110b of the positive electrode current collector 110 and formed over the periphery of the positive electrode layer 111. The projecting width of the flange 111a from the side face 110b is not specifically limited so long as the shape of the flange 111a can be maintained, but the width may be 2 μm to 20 μm or so, or preferably 10 μm or so, for example. How the flange 111a is formed will be described later.

Figure 4:
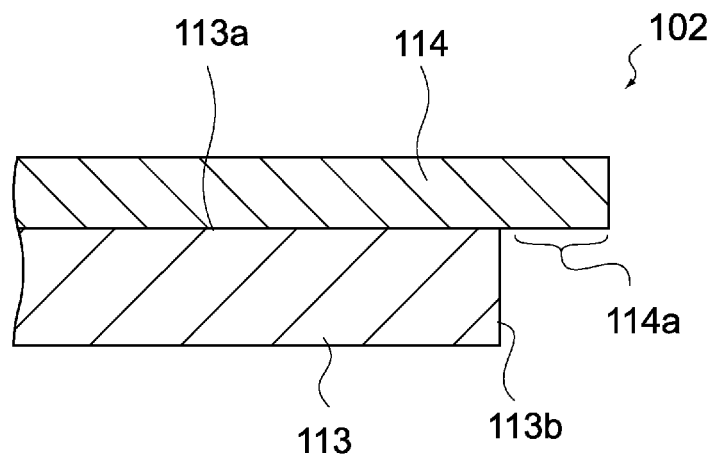
FIG. 4 is a section view of the negative electrode of the same electrochemical device.

The negative electrode 102 functions as the negative electrode of the electrochemical device 100. FIG. 4 is an enlarged section view of the negative electrode 102. As shown in this figure, the negative electrode 102 has a negative electrode current collector 113 and negative electrode layer 114.

The negative electrode current collector 113 may be a foil made of metal or other conductive material, such as an aluminum foil. As shown in FIG. 4, the negative electrode current collector 113 has a main face 113a and a side face 113b. The main face 113a is a surface (front or back face) along the direction vertical to the thickness direction of the negative electrode current collector 113, while the side face 113b is a surface (end face) along the thickness direction of the negative electrode current collector 113.

The negative electrode layer 114 is a layer containing active material and formed on the main face 113a of the negative electrode current collector 113. To be specific, the negative electrode layer 114 may be constituted by active material and binder, and it can be a mixture of active carbon being the active material and synthetic resin being the binder. If the separator 103 is to be layered on both the front face and back face of the negative electrode 102, then the negative electrode layer 114 can be provided not only on the main face 113a, but also on its back face.

The negative electrode layer 114 has a flange 114a. The flange 114a is a part projecting like an eave from the side face 113b of the negative electrode current collector 113 and formed over the periphery of the negative electrode layer 114. The projecting width of the flange 114a from the side face 113b is not specifically limited so long as the shape of the flange 114a can be maintained, but the width may be 2 μm to 20 μm or so, or preferably 10 μm or so, for example. How the flange 114a is formed will be described later.

The separator 103 is placed between the positive electrode 101 and negative electrode 102 to let the electrolyte pass through it, while preventing the positive electrode layer 111 and negative electrode layer 114 from contacting each other. The separator 103 may be a woven fabric, nonwoven fabric, synthetic resin-based microporous membrane, etc.

The positive electrode terminal 104 is electrically connected to the positive electrode current collector 110 and functions as the terminal of the positive electrode 101. The positive electrode terminal 104 may be a foil or wire material made of conductive material.

The negative electrode terminal 105 is electrically connected to the negative electrode current collector 113 and functions as the terminal of the negative electrode 102. The negative electrode terminal 105 may be a foil or wire material made of conductive material.

The film package 106 houses and seals in the positive electrode 101, negative electrode 102, separator 103 and electrolyte. The film package 106 may be a sheet-shaped material made of insulating material. For example, it may be an aluminum laminate material. Additionally, a case, etc., made of synthetic resin may be used instead of the film package 106.

The electrolyte sealed in the film package 106 is not specifically limited so long as it contains anions and cations. For example, $SBP.BF_4$ (5-azoniaspiro[4.4]nonane tetrafluoroborate)/PC (propylene carbonate), etc., can be used.

The electrochemical device 100 has the aforementioned constitution. Although the flange 111a is provided on the positive electrode layer 111 and flange 114a is provided on the negative electrode layer 114 here, a flange may be provided only on either the positive electrode layer 111 or negative electrode layer 114. Nevertheless, providing a flange on both the positive electrode layer 111 and negative electrode layer 114 is preferred because it achieves greater effects from the flanges (described later).

[Operation and Effects of Electrochemical Device]

The electrochemical device 100 operates as follows. When the positive electrode terminal 104 and negative electrode terminal 105 are connected to an external power supply and charging starts, the anions in the electrolyte migrate to the positive electrode 101 and get adsorbed onto the surface of the active material in the positive electrode layer 111 to form electric double layers. At the same time, the cations in the electrolyte migrate to the negative electrode 102 and get adsorbed onto the surface of the active material in the negative electrode layer 114 to form electric double layers. As a result, electric charges are accumulated at the positive electrode 101 and negative electrode 102, respectively. At the time of discharge, the electric double layers disappear at the positive electrode 101 and negative electrode 102, while current is taken out of the positive electrode terminal 104 and negative electrode terminal 105. This charge/discharge cycle is repeated in the electrochemical device 100.

Figure 5:
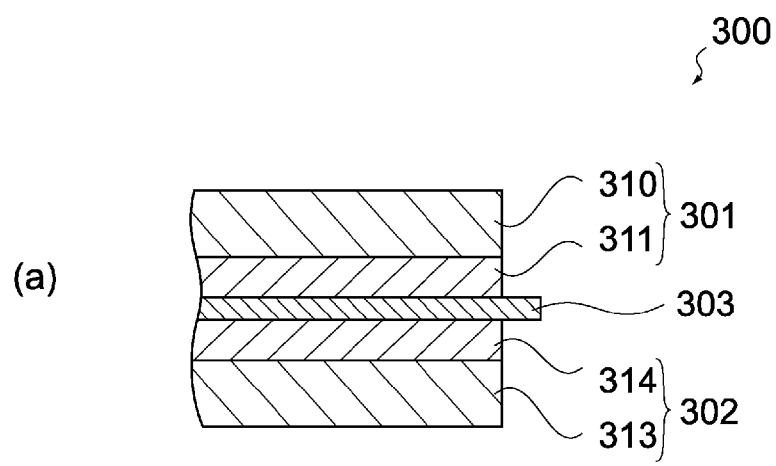
FIG. 5 consists of (a) and (b) illustrating a schematic cross sectional view and a schematic exploded perspective view of an electrochemical device (electrodes and separator), respectively, pertaining to a comparative example.
Figure 5:
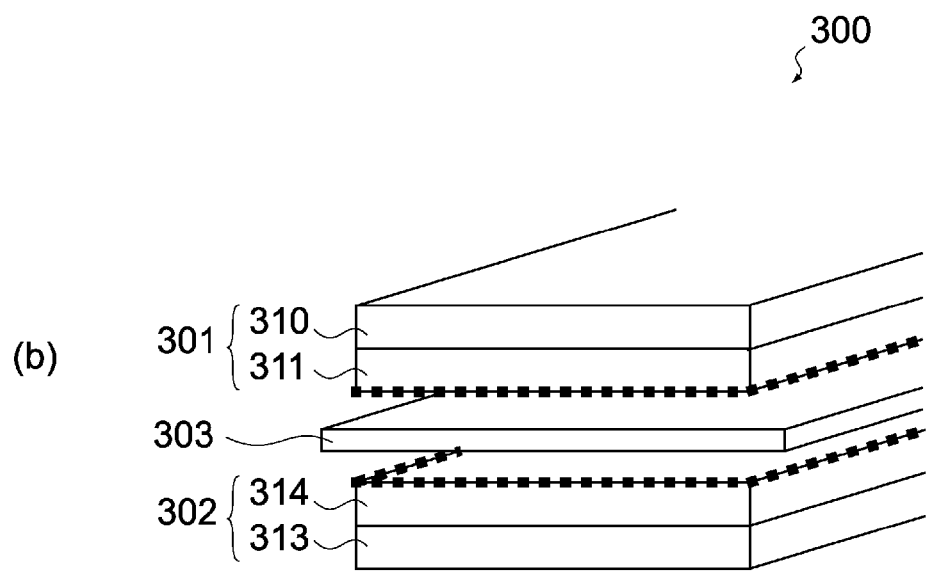

Here, the electrochemical device 100 is capable of mitigating the concentration of current at the edges of the electrode layer. FIG. 5 shows the electrodes and separator of a general electrochemical device 300 (comparative example), where (a) in FIG. 5 is a section view of the electrochemical device 300, while (b) in FIG. 5 is an exploded perspective view of the electrochemical device 300. As shown in these figures, the electrochemical device 300 has a positive electrode 301, negative electrode 302, and separator 303. The positive electrode 301 comprises a positive electrode current collector 310 and positive electrode layer 311, while the negative electrode 302 comprises a negative electrode current collector 313 and negative electrode layer 314.

As shown in (a) in FIG. 5, the comparative electrochemical device 300 does not have, on either the positive electrode layer 311 or negative electrode layer 314, a component corresponding to the flange of the electrochemical device 100. With this electrochemical device 300, current concentrates at the edges of the positive electrode layer 311 and negative electrode layer 314 during charge. (b) in FIG. 5 shows the edges of the positive electrode layer 311 and negative electrode layer 314 where current concentrates, with chain lines.

With the electrochemical device 100, on the other hand, the flange 111a is formed on the positive electrode layer 111 and flange 114a is formed on the negative electrode layer 114, and therefore the electric charges are dispersed and charge collecting resistance increases at the edges of the positive electrode layer 111 and negative electrode layer 114. This in turn mitigates the concentration of current at these edges to prevent the electrodes from deteriorating and improves the reliability of the electrochemical device.

[Method for Manufacturing Electrochemical Device]

The method for manufacturing the electrochemical device 100 is explained. Since the positive electrode 101 and negative electrode 102 of the electrochemical device 100 can use an electrode of the same constitution, how this electrode (hereinafter referred to as "electrode 150") is produced is explained.

Figure 6:
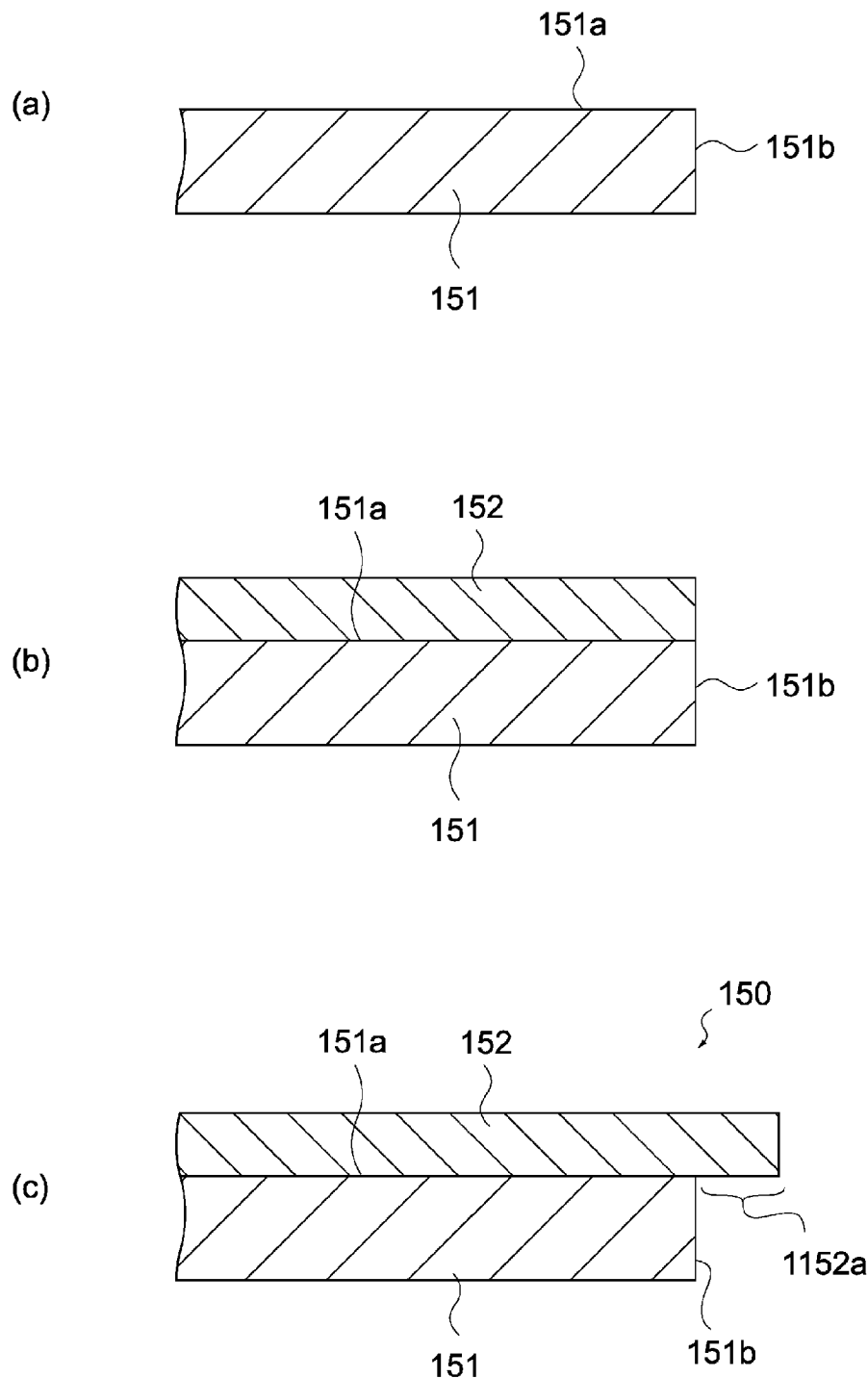
FIG. 6 consists of (a), (b), and (c) illustrating schematic views of a method for producing the electrode of the electrochemical device pertaining to the first embodiment of the present invention.

FIG. 6 provides schematic drawings illustrating the method for manufacturing the electrode 150. As shown in (a) in FIG. 6, a current collector 151 is prepared in the form of an aluminum foil, etc. The current collector 151 can have any thickness, but it may be 20 μm, for example. The current collector 151 has a main face 151a and a side face 151b.

Next, a slurry is coated on the main face 151a. The slurry may be a mixture of active carbon or other active material and synthetic resin or other binder. This way, an electrode layer 152 is formed on the main face 151a, as shown in (b) in FIG. 6. The electrode layer 152 can have any thickness, but it may be 20 μm, for example. The current collector 151 on which the electrode layer 152 has been formed is cut to a specified size, as necessary.

Next, the current collector 151 and electrode layer 152 are rolled. As a result, the electrode layer 152 is stretched and a flange 152a is formed, as shown in (c) in FIG. 6. Electrodes 150 thus produced are layered as the positive electrode 101 and negative electrode 102 with the separator 103 (refer to FIG. 2). They are layered so that the positive electrode layer 111 and negative electrode layer 114 are on the separator 103 side. Next, a positive electrode terminal 104 is connected to the positive electrode 101, and a negative electrode terminal 105 is connected to the negative electrode 102, both by means of supersonic welding, etc. The resulting laminate is dried by means of hot vacuum drying, etc., and housed in a film package 106. Electrolyte is injected into the film package 106 and sealed with sealing material, etc. The electrochemical device 100 can be manufactured as above.

Second Embodiment

The electrochemical device pertaining to a second embodiment of the present art is explained.

[Structure of Electrochemical Device]

An electrochemical device 200 pertaining to this embodiment is different from the electrochemical device 100 pertaining to the first embodiment only in terms of how the positive electrode and negative electrode are constructed, so all other components are denoted by the same symbols assigned to the corresponding components in the first embodiment and their explanations are omitted.

Figure 7:
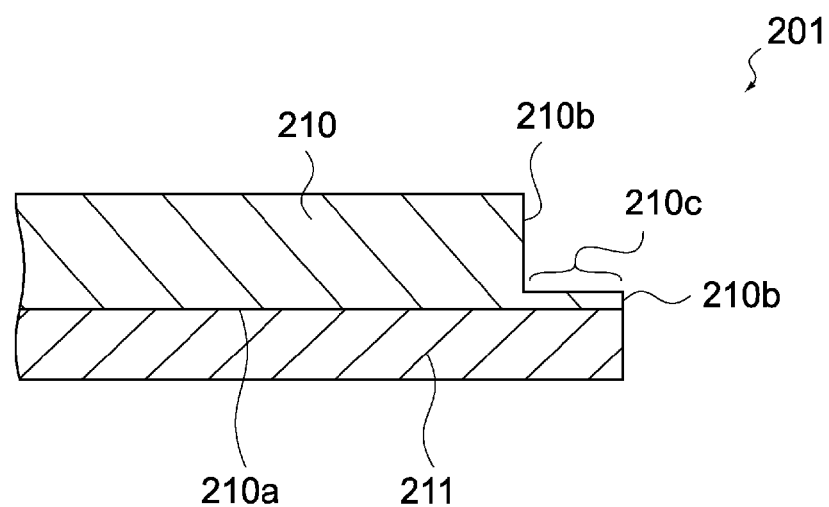
FIG. 7 is a section view of the positive electrode of the electrochemical device pertaining to a second embodiment of the present invention.

A positive electrode 201 functions as the positive electrode of the electrochemical device 200. FIG. 7 is an enlarged section view of the positive electrode 201. As shown in this figure, the positive electrode 201 has a positive electrode current collector 210 and a positive electrode layer 211.

The positive electrode current collector 210 may be a foil made of metal or other conductive material, such as an aluminum foil. As shown in FIG. 7, the positive electrode current collector 210 has a main face 210a and a side face 210b. The main face 210a is a surface (front or back face) along the direction vertical to the thickness direction of the positive electrode current collector 210, while the side face 210b is a surface (end face) along the thickness direction of the positive electrode current collector 210.

The side face 210b is formed in concave-convex shape with its main-face 210a side projecting, to support the positive electrode layer 211. This projected part of the side face 210b is hereinafter referred to as "support 210c." The support 210c is formed over the periphery of the positive electrode current collector 210. The projecting width of the support 210c may be 2 μm to 20 μm or so, or preferably 10 μm or so, for example. How the support 210c is formed will be described later.

The positive electrode layer 211 is a layer containing active material and formed on the main face 210a of the positive electrode current collector 210. To be specific, the positive electrode layer 211 may be constituted by active material and binder, and it can be a mixture of active carbon being the active material and synthetic resin being the binder. If the separator is to be layered on both the front face and back face of the positive electrode 201, then the positive electrode layer 211 can be provided not only on the main face 210a, but also on its back face.

Figure 8:
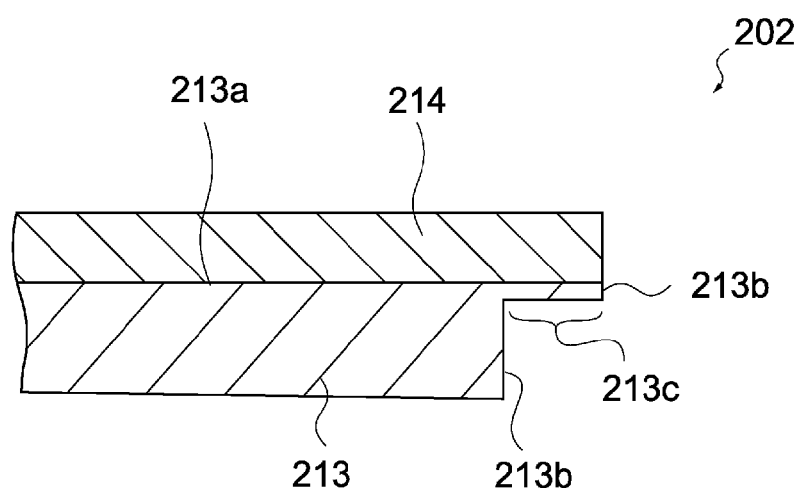
FIG. 8 is a section view of the negative electrode of the same electrochemical device.

A negative electrode 202 functions as the negative electrode of the electrochemical device 200. FIG. 8 is an enlarged section view of the negative electrode 202. As shown in this figure, the negative electrode 202 has a negative electrode current collector 213 and a negative electrode layer 214.

The negative electrode current collector 213 may be a foil made of metal or other conductive material, such as an aluminum foil. As shown in FIG. 8, the negative electrode current collector 213 has a main face 213a and a side face 213b. The main face 213a is a surface (front or back face) along the direction vertical to the thickness direction of the negative electrode current collector 213, while the side face 213b is a surface (end face) along the thickness direction of the negative electrode current collector 213.

The side face 213b is formed in concave-convex shape with its main-face 213a side projecting, to support the negative electrode layer 214. This projected part of the side face 213b is hereinafter referred to as "support 213c." The support 213c is formed over the periphery of the negative electrode current collector 213. The projecting width of the support 213c may be 2 μm to 20 μm or so, or preferably 10 μm or so, for example. How the support 213c is formed will be described later.

The negative electrode layer 214 is a layer containing active material and formed on the main face 213a of the negative electrode current collector 213. To be specific, the negative electrode layer 214 may be constituted by active material and binder, and it can be a mixture of active carbon being the active material and synthetic resin being the binder. If the separator is to be layered on both the front face and back face of the negative electrode 202, then the negative electrode layer 214 can be provided not only on the main face 213a, but also on its back face.

The electrochemical device 200 has the aforementioned constitution. Although the support 210c is provided on the positive electrode current collector 210 and support 213c is provided on the negative electrode current collector 213 here, a support may be provided only on either the positive electrode current collector 210 or negative electrode current collector 213. Nevertheless, providing a support on both the positive electrode current collector 210 and negative electrode current collector 213 is preferred because it achieves greater effects from the supports.

[Operation and Effects of Electrochemical Device]

The electrochemical device 200 undergoes the same charge/discharge cycle as the electrochemical device 100 pertaining to the first embodiment. Here, with the electrochemical device 200, the support 210c is formed on the positive electrode current collector 210, while the support 213c is formed on the negative electrode current collector 213, and therefore the electric charges are dispersed and charge collecting resistance increases at the edges of the positive electrode layer 211 and negative electrode layer 214. This mitigates the concentration of current at these edges to prevent the electrodes from deteriorating and improves the reliability of the electrochemical device.

[Method for Manufacturing Electrochemical Device]

The electrochemical device 200 can be manufactured according to the same manufacturing method used for the electrochemical device 100 pertaining to the first embodiment. The conditions under which the electrode layer formed on the current collector is rolled cause the side face of the current collector to be partially stretched together with the electrode layer, to form a support.

EXAMPLES

The electrochemical devices described below were produced and tested to confirm the effects of the electrochemical devices explained in the respective embodiments above.

A slurry mixture of active carbon as the active material, and carboxy methyl cellulose and styrene butadiene rubber as the binder, was coated on a current collector (aluminum foil of 20 μm in thickness) to produce an electrode layer (20 μm in thickness) for use as an electrode sheet.

Comparative Example 1

The electrode sheet was rolled to a specified thickness and then stamped to specified dimensions using a die, to obtain an electrode.

Example 1

The electrode sheet was stamped using a die and then rolled, to obtain an electrode of specified dimensions having a flange on its electrode layer.

Example 2

The electrode sheet was stamped using a die and then rolled, to obtain an electrode of specified dimensions having a support on its current collector.

A positive electrode and a negative electrode, both based on the electrode pertaining to each of the comparative example and examples above, were layered with a separator (cellulose separator of 30 μm in thickness) in between. The separator had been cut to specified dimensions using a die. A positive electrode terminal was connected to the current collector of the positive electrode, and a negative electrode terminal was connected to the current collector of the negative electrode, both by means of supersonic welding. The resulting laminate was vacuum-dried at 180° C. for 36 hours.

The laminate was housed in an aluminum laminate encapsulation material and electrolyte was injected, after which sealing material was used to thermally fuse the sealed areas. For the electrolyte, $SBP.BF_4/PC$ (1.0 mol/L) was used. An electrochemical device of approx. 20 mm×26 mm in size was thus produced.

A 10,000-cycle test was conducted at a peak voltage of 2.5 V and maximum current of 5 A on the electrochemical devices pertaining to Comparative Example 1, Example 1, and Example 2, to measure the cell capacity and internal resistance. For the measurement of capacity, each electrochemical device was charged to 2.5 V for 10 minutes in the CCCV (constant current, constant voltage) mode using a charger/discharger at 100 mA, and then discharged at 10 mA. The capacity was calculated from the slope of the discharge curve. For the measurement of internal resistance, the impedance at 1 kHz was measured using impedance measuring equipment.

In the case of Example 1, the capacity maintenance rate improved 5%, while the rate of increase in internal resistance dropped 8%, compared to Comparative Example 1 after the cycle test. The dispersion of electric charges and increase in charge collecting resistance at the edges of the electrode layer reduced the concentration of current, and reliability of the electrochemical device improved as a result.

In the case of Example 2, the capacity maintenance rate improved 4%, while the rate of increase in internal resistance rose 6%, compared to Comparative Example 1 after the cycle test. Reliability of the electrochemical device improved, albeit to a lesser degree than in Example 1.

As explained above, the electrochemical device pertaining to the present invention can mitigate the concentration of current at the edges of the electrode layer, by providing a flange on the electrode layer or a support on the current collector, thereby preventing electrode deterioration and improving device reliability.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-110221, filed May 24, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrode for an electrochemical device comprising:
a current collector that has a main face as well as a side face, said side face having a concave-convex shape whose convex part is constituted by a projection extending along the main face, said projection forming a support portion; and
an electrode layer that contains active material and is formed on and in contact with the main face including a surface formed by the support portion,
wherein the support portion is formed along a periphery of the electrode layer.

2. An electrochemical device comprising:
a first electrode comprising:
a first current collector that has a first main face and a first side face, said first side face having a concave-convex shape whose convex part is constituted by a projection extending along the first main face, said projection forming a first support portion, and
a first electrode layer that contains active material and is formed on and in contact with the first main face, including a surface formed by the first support portion,
wherein the first support portion is formed along a periphery of the first electrode layer;
a second electrode comprising:
a second current collector that has a second main face and a second side face, said second side face having a concave-convex shape whose convex part is constituted by a projection extending along the second main face, said projection forming a second support portion, and
a second electrode layer that contains active material and is formed on and in contact with the second main face, including a surface formed by the second support portion,
wherein the second support portion is formed along a periphery of the second electrode layer; and
a separator placed between the first electrode and second electrode to prevent the first electrode layer and second electrode layer from contacting each other.

3. A method for manufacturing an electrode for an electrochemical device comprising:
forming an electrode layer containing active material on a main face of a current collector having the main face and a side face; and
forming a projection in the side face along a periphery of the electrode layer so that the side face has a concave-convex shape whose convex part is constituted by the projection extending along the main face, while extending the periphery of the electrode layer on the projection, by means of rolling the current collector and electrode layer.

* * * * *